US008427943B2

(12) United States Patent
Gahm et al.

(10) Patent No.: US 8,427,943 B2
(45) Date of Patent: Apr. 23, 2013

(54) BANDWIDTH-AWARE MULTICAST LOAD BALANCING ON A MULTI-INTERFACE HOST

(75) Inventors: Joshua Gahm, Newtonville, MA (US); David Oran, Acton, MA (US); Toerless Eckert, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 757 days.

(21) Appl. No.: 12/021,230

(22) Filed: Jan. 28, 2008

(65) Prior Publication Data

US 2009/0190474 A1 Jul. 30, 2009

(51) Int. Cl.
*H04L 12/26* (2006.01)

(52) U.S. Cl.
USPC ............ 370/230; 370/389; 370/419; 709/225

(58) Field of Classification Search ........................ None
See application file for complete search history.

(56) References Cited

U.S. PATENT DOCUMENTS

| | | | | |
|---|---|---|---|---|
| 5,742,607 | A * | 4/1998 | Beighe et al. | 370/419 |
| 6,185,221 | B1 * | 2/2001 | Aybay | 370/412 |
| 6,349,340 | B1 * | 2/2002 | Dyer et al. | 709/231 |
| 6,826,612 | B1 * | 11/2004 | Bosloy et al. | 709/227 |
| 7,283,477 | B1 | 10/2007 | Fedyk et al. | |
| 2004/0111529 | A1 | 6/2004 | Parmar | |
| 2004/0179522 | A1 * | 9/2004 | Basso et al. | 370/386 |
| 2007/0147374 | A1 * | 6/2007 | Lee et al. | 370/390 |
| 2007/0177594 | A1 | 8/2007 | Kompela | |
| 2007/0183418 | A1 * | 8/2007 | Riddoch et al. | 370/389 |
| 2008/0040487 | A1 * | 2/2008 | Lioy et al. | 709/227 |
| 2008/0056137 | A1 | 3/2008 | Ravindran et al. | |
| 2008/0056293 | A1 * | 3/2008 | Robbins et al. | 370/432 |
| 2008/0077692 | A1 * | 3/2008 | Zuberi | 709/227 |
| 2008/0159141 | A1 * | 7/2008 | Soukup et al. | 370/235 |
| 2008/0175269 | A1 | 7/2008 | Alvarez et al. | |
| 2009/0080328 | A1 * | 3/2009 | Hu et al. | 370/230 |

FOREIGN PATENT DOCUMENTS

| | | |
|---|---|---|
| EP | 1235409 | 8/2002 |
| GB | 2438664 | 12/2007 |

OTHER PUBLICATIONS

Cain et al., Request for Comment (RFC) 3376, Internet Group Management Protocol, Version 3, Oct. 2002, The Internet Society.

Thaler et al., Request for Comment (RFC) 3678, Socket Interface Extensions for Multicast Source Filters, Jan. 2004, The Internet Society.

F. Guo et al., "Experiences in Building a Multihoming Load Balancing System", Infocom 2004, Twenty-Third Annual Joint Conference of the IEEE Computer and Communications Societies, vol. 2, Mar. 7, 2004, pp. 1241-1251.

Royer E.M. et al., "An implementation study of the AODV routing protocol", Wireless Communications and Networking Conference, Sep. 23, 2000, pp. 1003-1008.

H. Huang et al., "Load-sharing in Wireless Multi-homed systems", 2005 IEEE International Conference on Communications, vol. 5, May 16 2005, pp. 3489-3493. WIPO PCT Office, "Communication Relating to the Results of the Partial International Search", Apr. 27, 2009, 5 pgs.

Stolowitz Ford Cowger LLP, Listing of Related Cases, Jan. 14, 2010.

* cited by examiner

*Primary Examiner* — Yemane Mesfin
*Assistant Examiner* — Khoa Huynh
(74) *Attorney, Agent, or Firm* — Merchant & Gould

(57) ABSTRACT

In one embodiment, a network device having a plurality of network interfaces maintains a database tracking multicast memberships associated with the network interfaces. The network device then uses the database for load balancing received multicast traffic over the network interfaces.

17 Claims, 3 Drawing Sheets

BANDWIDTH-AWARE MULTICAST LOAD BALANCING ON A MULTI-INTERFACE HOST

TECHNICAL FIELD

The present disclosure relates generally to the field of networking and video.

BACKGROUND

Multi-interface hosts, sometimes referred to as multi-homed devices, have two or more network interfaces, such as two Gigabit Ethernet interfaces. In contrast to unicast transmissions where a sending host and/or routing infrastructure address the unicast transmission to one of the receiving host's network interfaces, in multicast transmissions applications running on the receiving host select which interface "joins" the multicast group and receives the data stream. Specifically, an application running on the receiving host sends a multicast membership join request, using a protocol such as Internet Group Management Protocol (IGMP) described in Request For Comment (RFC) 3376, to cause the corresponding multicast streams to be received on one of the receiving host's network interfaces of the application's selection.

If the interface selected by the application does not have sufficient link bandwidth available for the new stream, packets will be dropped from the new stream and/or existing streams received on the selected interface. Also, since the application does not observe whether other applications are already receiving the data stream on one of the other interfaces, the multi-interface host may end up wasting bandwidth by causing an interface to join a stream already being received on another interface. The application may also select a network interface that has failed, sometimes causing the application to become inoperable. The disclosure that follows solves this and other problems.

DESCRIPTION OF EXAMPLE EMBODIMENTS

Overview

Figure 1:
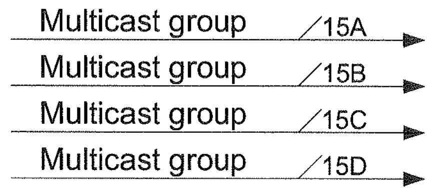
FIG. 1 illustrates one example of a multi-interface host that controls how multicast streams are joined to more efficiently utilize interface bandwidth.
Figure 1:
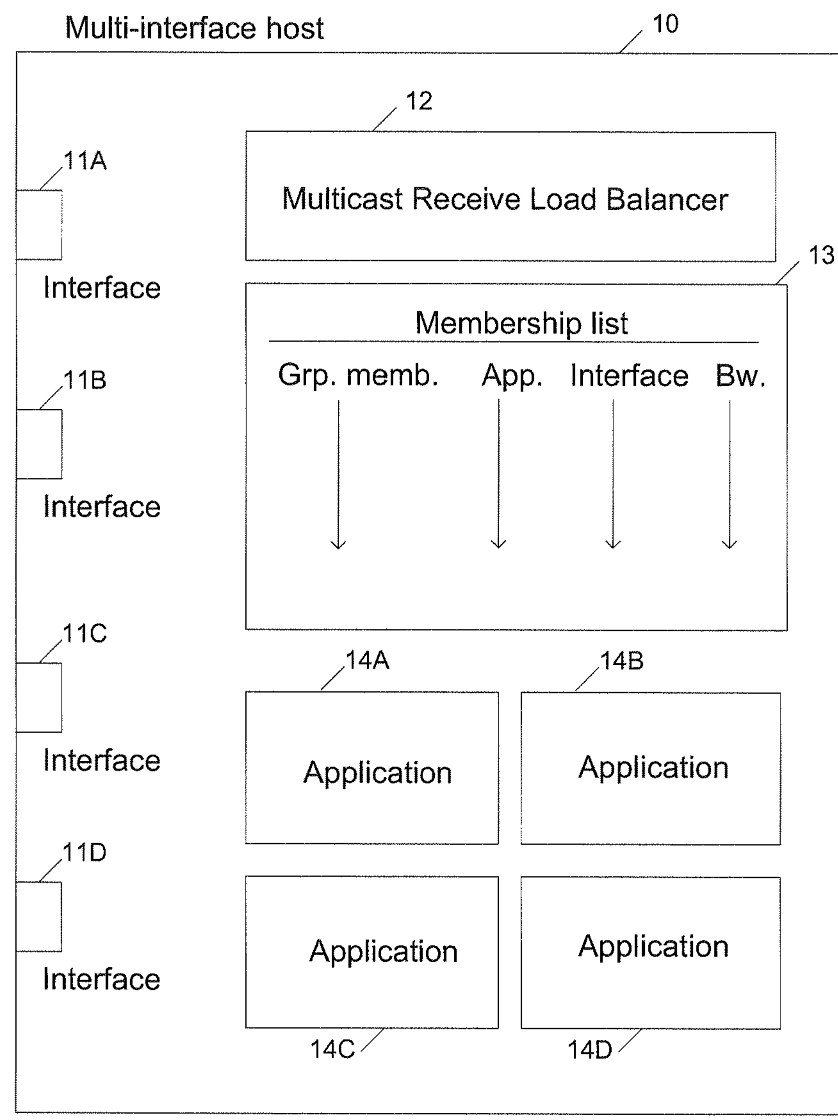

In one embodiment, a network device having a plurality of network interfaces maintains a database tracking multicast memberships associated with the network interfaces. The network device then uses the database for load balancing received multicast traffic over the network interfaces.

DESCRIPTION

Several preferred examples of the present application will now be described with reference to the accompanying drawings. Various other examples of the invention are also possible and practical. This application may be exemplified in many different forms and should not be construed as being limited to the examples set forth herein.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device. Only those parts of the various units are shown and described which are necessary to convey an understanding of the examples to those skilled in the art.

FIG. 1 illustrates one example of a multi-interface host that controls how multicast streams are joined to more efficiently utilize interface bandwidth.

The multi-interface host 10 includes a Multicast Receive Load Balancer (MRLB) 12 and a membership list database 13. The MRLB 12 manages the database 13 and controls, according to the database 13, which of the interfaces 11A-D join which of the multicast groups 15A-15D. In the present example, the MRLB 12 is implemented as a server process running on the multi-interface host 11. The MRLB 12 communicates with the client applications 14A-D using standard Application Program Interface (API) calls. In other examples, standard Inter Process Communication (IPC) mechanisms or any other communication scheme may be used between the MRLB 12 and the applications 14A-D. Although the MRLB 12 is a software entity in the present example, the MRLB 12 can be implemented as hardware.

The database 13 is a table stored in a memory of the host 10. The database 13 includes membership entries for each multicast group membership. For each membership, the database 13 indicates which one or ones of the applications 14A-D access the corresponding multicast stream, which one or ones of the interfaces 11A-D are used to receive the corresponding multicast stream, and bandwidth required by the interfaces for receiving the corresponding multicast stream.

In contrast to prior solutions, where the applications 14A-D addressed the add/delete requests to the interfaces 11A-D to control joining of the multicast groups 15A-D by the interfaces 11A-D, here the applications 14A-D send the add/delete requests to the MRLB 12. As will be explained later in greater detail with reference to FIG. 2, the MRLB 12 sends add requests to the interfaces 11A-D for only a subset of the received add requests that it receives, effectively filtering certain add requests that would cause the same stream to be received by more than one of the interfaces 11A-D. Similarly, since more than one of the applications 14A-D may utilize a same one of the multicast groups 15A-D, the MRLB 12 also effectively filters certain delete requests.

When none of the interfaces 11A-D has bandwidth available to receive the requested stream, as will be explained in greater detail later, the MRLB 12 may reject and/or defer the add request. If necessary, the MRLB 12 updates the database 13 according to the handling of the request. Otherwise, when at least one of the interfaces 11A-D has bandwidth available to join the requested stream, the MRLB 12 intelligently selects one or more of the interfaces 11A-D for receiving the requested stream according to an analysis of the database 13 as will be explained later in greater detail with reference to FIG. 2. The MRLB 12 then triggers the selected interfaces(s) to join the multicast group.

It should be understood that the network interfaces 11A-D managed by the MRLB may be only a subset of the network interfaces on the host 10 and, at times, an additional network interface may be added to this managed group. The additional network interface may be added to the managed group when, for example, a new network interface is installed on the host 10, an administrator performs resource reassignment to provide an additional existing network interface to the MRLB 12, a previously failed network interface recovers, etc. The MRLB 12 monitors for one of these events, and in response to such an event being detected, may send delete requests for one or more multicast streams received on the interfaces 11A-D and sends add requests to cause these streams to thereafter be received on the newly available interface. The MRLB 12 formats the database 13 according to this reassignment. Similarly, it should be understood that a network interface may be removed from the managed group, in which case the MRLB 12 may perform similar reassignments of multicast groups.

As a result of the above-described functions, the multi-interface host 10 more efficiently and reliably utilizes interface bandwidth for a given multicast load. The MRLB 12 ensures that a traffic load is balanced amongst the interfaces 11A-D such that no interface has an assigned bandwidth greater than an administratively assigned or other predefined percentage of its maximum bandwidth capability. As will be explained in greater detail later, the MRLB 12 can also reassign memberships between the interfaces 11A-D for any reason such as if one of the interfaces fails.

It is noted that, in the present example, the multi-interface host 10 is an Internet Protocol (IP) host with a plurality of, for example, Gigabit Ethernet network interfaces. As an IP host, the multi-interlace host 10 can provide numerous capabilities, such as providing services relating to a number of broadcast Internet Protocol TeleVision (IPTV) channels and load balancing the channels across the Gigabit Ethernet network interfaces. It should be readily apparent that any type of receiving endpoint can load balance any type of multicast streams across more than one interface.

It is also noted that, in the present example, the applications 14A-D are configured to send the add/delete requests to the MRLB 12. In other examples were the applications are not so configured, the existing protocols for changing multicast group membership can be extended so that all add/delete requests addressed to one of the interfaces 11A-D are always provided to the MRLB 12. For example, this may be accomplished by modifying an operating system of the multi-interface host 10, by adding a shim library between the operating system and the application, or by creating a backward compatible extension to the multicast group membership API.

Figure 2:
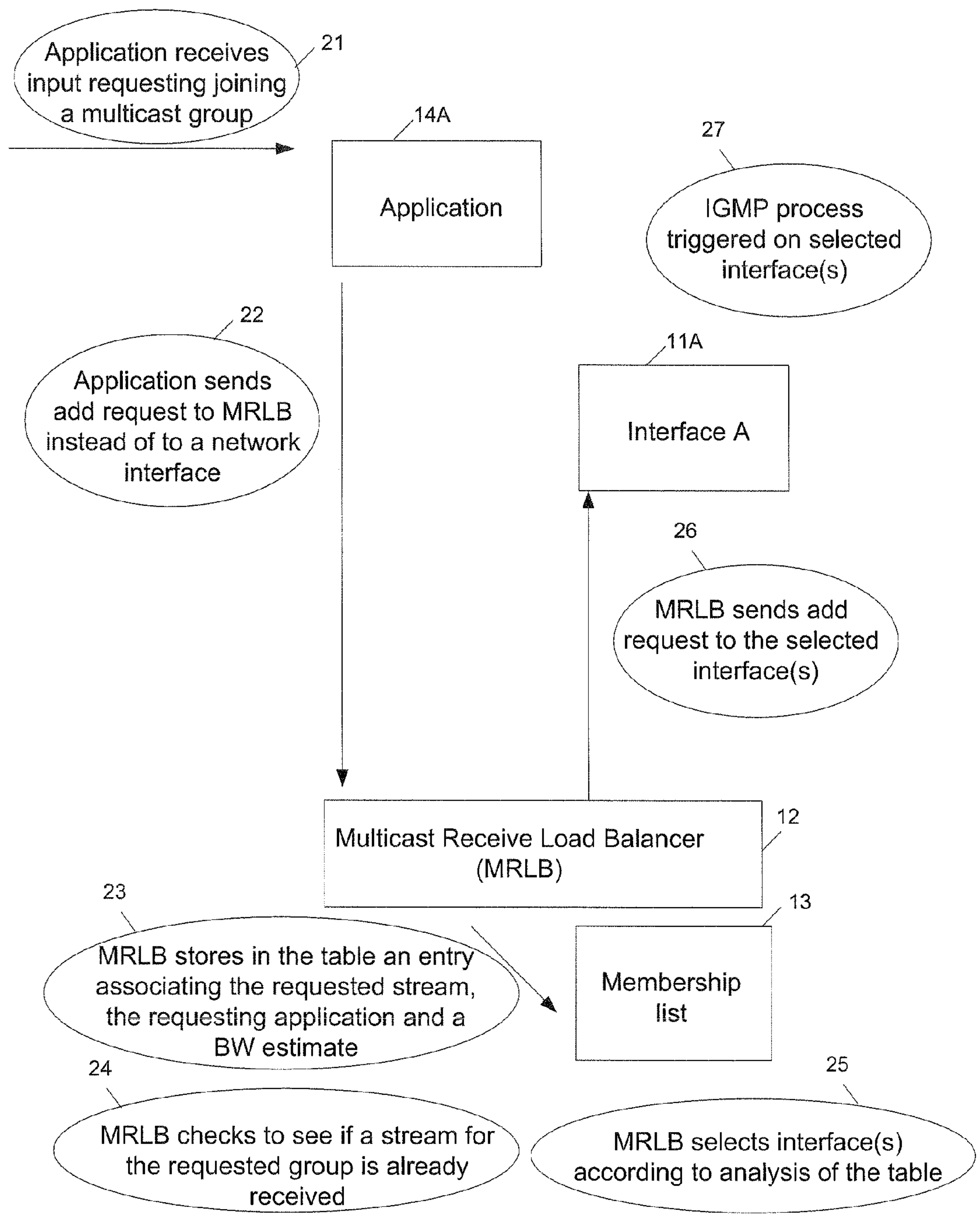
FIG. 2 illustrates how the multicast receive load balancer of the multi-interface host shown in FIG. 1 controls the joining of multicast streams.

FIG. 2 illustrates how the multicast receive load balancer of the multi-interface host shown in FIG. 1 controls the joining of multicast streams.

In process 21, the application 14A receives an input requesting reception of a multicast stream, which requires joining a multicast group. The input may be provided locally by a user or received over a network.

In process 22, the application 14A sends an add request identifying the multicast group address to the MRLB 12 instead of directly to a network interface. In the present example, this is performed by way of the application 14A using an API call, which is described in Request For Comment (RFC) 3678 herein incorporated by reference in its entirety. The API call used in this example does not identify any network interfaces and is sent to the MRLB 12. Preferably, the application 14A also sends an estimated amount of bandwidth to be consumed by joining the requested multicast stream. The application 14A may obtain this bandwidth estimate via any method, such as by user input, through a signaling protocol such as Session Description Protocol (SDP), by analysis of any aspect of the requested stream, by selecting between one or more default bandwidth estimate values, etc.

In process 23, the MRLB 12 stores an entry in the table 13, the entry associating the requesting application with the requested stream. If a bandwidth estimate was received, the MRLB 12 also stores the received bandwidth estimate in the table 13. If a bandwidth estimate is not received from the application, the MRLB 12 formats the entry using a bandwidth estimate that is obtained using any method such as, accessing a default bandwidth estimate, receiving a user input indicating a bandwidth estimate, accessing a table correlating multicast stream address ranges with default bandwidth estimates, analyzing any aspect of the requested stream, etc.

In process 24, the MRLB 12 analyzes the table 13 to see if the requested stream is already being received on one of the interfaces. If the received request identifies only a multicast group and no source filter, then the requested stream is being received if the database 13 includes an entity identifying the multicast group. If the received request identifies both a multicast group and a source filter, then the requested stream is being received if the database 13 includes an entry identifying both the multicast group and the source filter. If the stream is already being received on one of the interfaces, the MRLB 12 does not send an add request to any of the interfaces and the application 14A accesses the stream on the receiving interface. Even when the MRLB 12 does not send the add request, the MRLB 12 updates the database 13 according to the request to ensure that the stream is not deleted until there are no remaining applications requesting the stream.

Continuing with process 24, if the database 13 includes an initial match that has a same multicast group as identified in the request but that indicates a different source filter specification than the one provided in the request, the MRLB 12 identifies those local applications corresponding with the partially matching multicast groups. The MRLB 12 may then merge source filter specifications for at least a plurality of the identified applications into a single source filter. In such a case, the MLRB 12 updates the database to reflect the merged source filter information, and then also sends a request to the affected interfaces causing those interfaces to update their source filters. It should be understood that the request used to cause the affected interfaces to update their source filters is different than the previously discussed add requests and is described in more detail in RFC 3678.

In process 25, the MRLB selects one or more interfaces for the requested stream according to an analysis of the database 13. In the present example, the MRLB 12 selects one of the interfaces that has the most available bandwidth for the new multicast stream. If no single interface has sufficient bandwidth available for the new multicast stream, the MRLB 12 may either reject the add request or defer it until continuous monitoring indicates that sufficient bandwidth is available. However, in cases where the requested stream originates from multiple sources and the bandwidth from each source is known to the MRLB 12, the MRLB 12 may select more than one interface for distributing the stream by source across multiple interfaces. If the total bandwidth used on the interfaces approaches a predefined threshold of the total amount of bandwidth associated with the interfaces, the MRLB 12 may reject the request or defer the request until more bandwidth is available. In either case preferably the MRLB 12 provides the application with an indication as to which has occurred.

In other examples, the MRLB 12 may use other schemes that include priority assignments in the requests received by the MRLB 12. For example, a request marked low priority could be queued or rejected even though bandwidth is available on one of a subset of the interfaces reserved for higher priority requests. Similarly, a high priority request could be accommodated by deleting a multicast membership marked in the database as corresponding to only low priority requests thereby leaving the associated group and realizing more available bandwidth. Also, a subset of the network interfaces may be reserved for certain priority rankings while the remaining network interfaces are reserved for any priority ranking. Any ranking scheme, such as ones that assign priorities to applications, could be used by the MRLB 12 when selecting an interface for the requested multicast stream.

Continuing with process 25, in some examples it may be advantageous to use Equal-Cost Multi-Path (ECMP) routing as a way of selecting interfaces in addition to, or instead of, a priority scheme. The database 13 can track ECMP information such that multicast streams whose source filter addresses correspond to a same least-cost ECMP routing entry can be identified. Thereafter, these identified streams can be assigned to a same interface or same group of interfaces. Load balancing according to ECMP information is described in more detail in U.S. patent application Ser. No. 11/625,552, which is herein incorporated by reference in its entirety for all purposes.

In process 26, the MRLB 12 sends an add request to the selected interface(s). The add request triggers the selected interface(s) to, in process 27, join the multicast group for the requested stream via the Internet Group Management Protocol (IGMP), a multicast routing protocol such as Protocol Independent Multicast (PIM), or other multicast routing or group membership protocol. Before, after, or during the IGMP routine the MRLB 12 updates the entry in the database 13 with the selected interface(s).

Thereafter, the MRLB 12 monitors the interfaces for failures. If the selected interface(s) fail, the MRLB performs processes similar to processes 23-26. Namely, the MRLB 12 analyzes the table 13 to select a new interface for multicast streams associated with the failed interface by the table 13, sends add requests to the newly selected interfaces, and updates the table 13 to re-associate the streams with the interfaces according to the new add requests.

The above-described example describes how the MRLB 12 responds to an application requesting a multicast stream. When the MRLB 12 receives a request to delete a stream membership, the MRLB 12 responds similarly. Namely, the MRLB 12 locates the entry within its database that corresponds to the request, deletes the entry, and determines whether any other applications are using the stream. If no other applications are using the stream, the MRLB 12 then sends a delete request to the network interface(s) to remove the multicast membership via IGMP or other similar protocol.

The above-described example describes an MRLB 12 that is configured to assign a newly requested multicast stream to an interface with the most available bandwidth. It should be understood that this behavior is only an example and that many other behaviors for selecting the interface to service a channel are possible and useful. In other examples, it may be preferable to configure the MRLB 12 to avoid equal usage across the network interfaces, possibly to maximize the amount of free bandwidth on a single interface or for other reasons.

Figure 3:
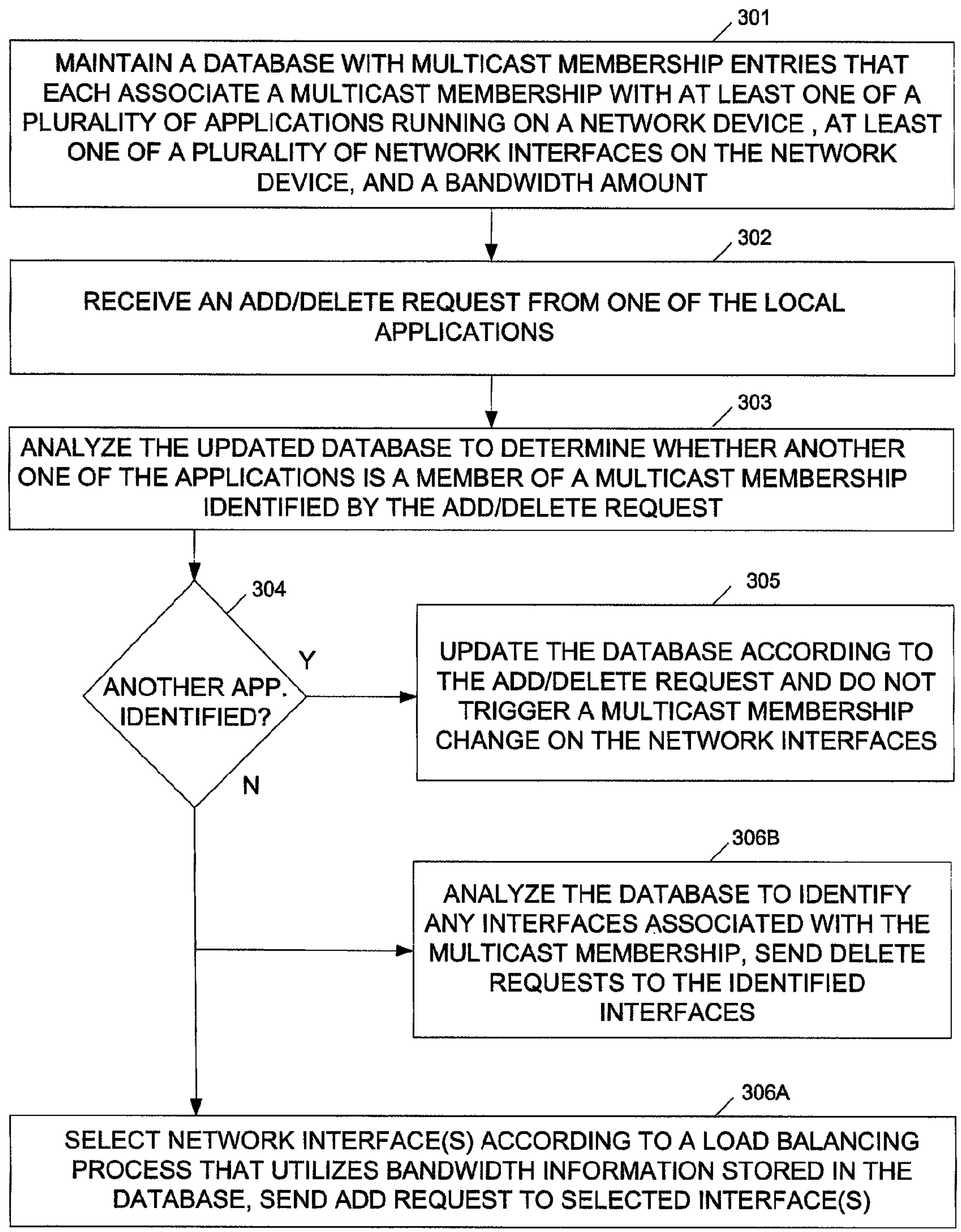
FIG. 3 illustrates an example method for using the multicast receive load balancer illustrated in FIGS. 1 and 2.

FIG. 3 illustrates an example method for using the multicast receive load balancer illustrated in FIG. 2.

In block 301, the MRLB 12 maintains a database with multicast group membership entries that each associate a multicast group with at least one of a plurality of applications running on a network device, at least one of a plurality of the network interfaces on the network device, and a bandwidth amount. In the present example, the formatted database includes one multicast group membership entry for each multicast stream received on the network device.

In block 302, the MRLB 12 receives an add/delete request from one of the local applications. In block 303, the MRLB 12 analyzes the database to determine whether another one of the local applications is a member of a multicast group identified in the received add/delete request. If another application is identified in decision box 304, in block 305 the MRLB 12 updates the database according to the add/delete request and does not trigger a multicast membership change on the network interfaces.

If no other application is identified in decision box 304, the MRLB 12 operates as shown in either block 306A or block 306B depending on whether the received request is an add request or a delete request. If an add request is received, in block 306A the MRLB 12 selects network interface(s) according to a load balancing process that utilizes bandwidth information stored in the database, and then sends an add request to the selected database. If a delete request is received, in block 306B the MRLB 12 analyzes the database to identify any network interfaces associated with the multicast group identified in the delete request, and then sends delete requests to the identified interface(s).

Several examples have been described above with reference to the accompanying drawings. Various other examples of the invention are also possible and practical. The system may be exemplified in many different forms and should not be construed as being limited to the examples set forth above. For example, in other examples the MRLB can select interface(s) to join a multicast group, then cause a corresponding application to generate and send an add request addressed to the selected interface.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown may be conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A system comprising:

a plurality of network interfaces, and a server operatively connected to the plurality of network interfaces, the server comprising a memory and a processor, the memory having a table containing entries associating multicast group memberships with the plurality of network interfaces, the table indicating an amount of bandwidth available on each of the plurality of network interfaces, the processor configured to:

receive a first add network interface request that does not specify any of the plurality of network interfaces;

responsive to receiving the first add network interface request, determine whether any of the plurality of network interfaces are currently members of a multicast group corresponding to a requested multicast stream;

analyze the table to determine an amount of bandwidth available on each of the plurality of network interfaces;

responsive to determining that none of the plurality of network interfaces are currently members of the multicast group corresponding to the requested multicast stream, select a network interface of the plurality of network interfaces based on the analysis of the available bandwidth amounts; and if there are no network interfaces among the plurality of network interfaces that are currently members of the corresponding multicast group, and if at least one of the plurality of network interfaces has sufficient bandwidth available for the requested multicast stream, identify a network interface from the plurality of network interfaces for the received request based at least in part on the available bandwidth amounts, that has the most available bandwidth;

trigger the identified network interface to join the corresponding multicast group by generating a second different add network interface request specifying the identified network interface;

cause the selected network interface to join the corresponding multicast group using the second add network interface request; and filter the first add request such that no other network interfaces receive the requested multicast stream.

2. The system of claim 1, wherein the processor is further configured to:

receive a request to stop providing a local application with the multicast stream;

analyze the table to determine whether the multicast stream is being provided to any other local applications; and only if the multicast stream is not being provided to the other local applications, trigger the selected network interface to delete itself from the multicast group.

3. The system of claim 1, wherein the processor is further configured to:

identify a priority ranking associated with the received request;

compare the priority ranking to priority rankings associated with the entries in the table; and make the selection according to the priority ranking comparison.

4. The system of claim 1, wherein the processor is further configured to make the selection from only a subset of the plurality of network interfaces.

5. The system of claim 4, wherein the processor is further configured to:

extract a priority ranking from the received first add network interface request; and identify the subset according to the priority ranking.

6. The system of claim 1, wherein a local application provides the first add network interface request by sending an Application Program Interface (API) call to a local server entity.

7. The system of claim 1, wherein the processor is configured to intercept the received first add network interface request by executing data contained in a shim library of a local operating system.

8. The system of claim 1, wherein the processor is further configured to:

continuously monitor the available bandwidth amounts; and select a network interface from the plurality of network interfaces for a deferred request when bandwidth becomes available.

9. The system of claim 1, wherein the processor is further configured to:

analyze the table to identify all applications associated with the multicast stream; and merge source filter specifications for at least a plurality of the identified applications into a single source filter.

10. The system of claim 1, wherein the first add network interface request is an internal request originating from a local application and being sent to the processor.

11. A method, comprising:

receiving a first add network interface request that does not specify any of a plurality of network interfaces of one network device;

accessing a database containing entries associating multicast group memberships with the plurality of network interfaces, the database indicating an amount of bandwidth available on each of the plurality of network interfaces;

responsive to receiving the first add network interface request, determining whether any of the plurality of network interfaces are currently members of a multicast group corresponding to a requested multicast stream;

responsive to determining that none of the plurality of network interfaces are currently members of the multicast group corresponding to the requested multicast stream, and if at least one of the plurality of network interfaces has sufficient bandwidth available for the requested multicast stream, identifying and selecting a network interface from the plurality of network interfaces for the received request based on an analysis of the available bandwidth amounts as indicated in the database;

triggering the selected network interface to join the corresponding multicast group to provide the requested multicast stream by generating a second different add network interface request specifying the selected network interface;

causing the selected network interface to join the corresponding multicast group using the second add network interface request; and filtering the first add request such that no other network interfaces receive the requested multicast stream.

12. The method of claim 11, wherein the received first add network interface request is a request to provide a local application with a data stream associated with the multicast group, and the method further comprises:

extracting an expected bandwidth value for the data stream from the received first add network interface request; and selecting the network interface according to the extracted bandwidth value.

13. The method of claim 11, wherein the received first add network interface request is a request to provide a local application with a data stream associated with the multicast group, and the method further comprises:

determining whether an expected bandwidth value for the data stream is included in the received first add network interface request;

if the bandwidth value is absent from the received first add network interface request, obtaining a default bandwidth value; and selecting the network interface according to one of the bandwidth values.

14. The method of claim 11, further comprising:

detecting a deletion or addition to a group of the plurality of network interfaces that is managed by a multicast received load balancer on the network device; and in response to said detecting, reassigning at least one multicast stream.

15. The method of claim 11, further comprising:

if the analysis of the database indicates that bandwidth is not available on the plurality of network interfaces, identifying a priority of the received first add network interface request;

comparing the priority of the received first add network interface request to priority indications included in the database; and sending a delete request to one of the plurality of network interfaces responsive to the comparison.

16. The method of claim 11, wherein the received first add network interface request is a request to provide a local application with a data stream associated with the multicast group, and the method further comprises:

identifying an expected bandwidth value for the data stream; and selecting the network interface according to the identified bandwidth value.

17. An apparatus, comprising:

a plurality of network interfaces;

a database containing entries associating multicast group memberships with the plurality of network interfaces, the database indicating an amount of bandwidth available on each of the plurality of network interfaces; and a processing device configured to:

receive a request to provide a local application with a multicast stream;

determine whether any of the plurality of network interfaces are currently members of a multicast group corresponding to the requested multicast stream;

check the amount of bandwidth available on each of the plurality of network interfaces as indicated by the database;

if there are no network interfaces among the plurality of network interfaces that are currently members of the corresponding multicast group, and if at least one of the plurality of network interfaces has sufficient bandwidth available for the requested multicast stream, identify a particular one of the plurality of network interfaces for the received request based at least in part on the available bandwidth amounts in the database by selecting a network interface, among the plurality of network interfaces, that has the most available bandwidth as indicated by the database;

trigger the particular network interface to join the corresponding multicast group to provide the local application with the requested multicast stream;

if there is a network interface among the plurality of network interfaces that is currently a member of the corresponding multicast group and already receiving the requested multicast stream, provide the local application with the requested multicast stream using the network interface; and filter the request such that no other network interfaces receive the requested multicast stream;

wherein the request is a first add network interface request that does not specify any network interfaces, and wherein the processing device is configured to trigger the particular network interface to join the corresponding multicast group by formatting a second different add network interface request that does specify one of the plurality of network interfaces.

* * * * *